US011782817B2

(12) United States Patent
Sayer et al.

(10) Patent No.: US 11,782,817 B2
(45) Date of Patent: Oct. 10, 2023

(54) AIDING DIAGNOSIS OF ERRORS IN CODE

(71) Applicant: International Business Machines Corporation, Armonk, NY (US)

(72) Inventors: Joseph Sayer, Bury St Edmunds (GB); Benjamin David Cox, Newbury (GB); Andy Lyell, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/448,054

(22) Filed: Sep. 20, 2021

(65) Prior Publication Data

US 2023/0085901 A1 Mar. 23, 2023

(51) Int. Cl.
G06F 9/44 (2018.01)
G06F 11/36 (2006.01)

(52) U.S. Cl.
CPC .............................. G06F 11/3636 (2013.01)

(58) Field of Classification Search
CPC .................................................. G06F 11/3636
See application file for complete search history.

(56) References Cited

U.S. PATENT DOCUMENTS

| 9,256,517 B1 | 2/2016 | Macpherson | |
| 2005/0198279 A1* | 9/2005 | Flocken | G06F 11/008 709/224 |
| 2006/0064677 A1* | 3/2006 | Bickson | G06F 11/3664 717/124 |
| 2009/0328004 A1* | 12/2009 | Balasubramanian | G06F 11/362 717/125 |
| 2010/0095157 A1* | 4/2010 | Aoyama | G06F 11/0778 714/E11.029 |
| 2011/0066908 A1* | 3/2011 | Bartz | H04L 41/0631 714/E11.01 |
| 2014/0237453 A1* | 8/2014 | Hulick, Jr. | G06F 8/70 717/127 |
| 2015/0127990 A1* | 5/2015 | Zhang | G06F 11/0781 714/37 |
| 2018/0365091 A1 | 12/2018 | Donaldson | |
| 2019/0018759 A1* | 1/2019 | Keinan | G06F 11/362 |
| 2020/0104238 A1 | 4/2020 | Radu | |

OTHER PUBLICATIONS

Disclosed Anonymously, "Automatic Problem Determination System via Stacktrace and Unit Test", An IP.com Prior Art Database Technical Disclosure, IP.com No. IPCOM000200366D, IP.com Electronic Publication Date: Oct. 8, 2010, 6 pages.

* cited by examiner

*Primary Examiner* — Hang Pan
(74) *Attorney, Agent, or Firm* — Stephen R. Yoder (57) ABSTRACT

Aiding diagnosis of errors in code based on a stack trace. Identifying target diagnostic information sources relevant to an obtained stack trace improves the efficiency and accuracy of the process of finding information for diagnosis of errors. This is achieved by analyzing the stack trace to identify stack trace elements and comparing the identified stack elements with diagnostic stack elements corresponding to diagnostic information sources from a database of diagnostic information sources.

15 Claims, 4 Drawing Sheets

AIDING DIAGNOSIS OF ERRORS IN CODE

BACKGROUND

When debugging during software development, the developer usually has access to a stack trace. The stack trace highlights where methods have been called from (files or libraries) and the order of the calls relating to each other during execution of the code. During the debugging process a developer will typically follow the stack trace to identify where errors have been thrown.

Usually, a developer will find where they think the error has occurred and start searching documentation to try and find a solution to the error. It is often unclear where the best place to search for the required information is. Indeed, it is common for the developer to be unsure whether the error has been resolved previously at all. Overall, the process can be incredibly time consuming and confusing. Furthermore, this is compounded in the case that multiple errors have been thrown.

Overall, due to the complexity of interpreting the stack trace and finding relevant information in order to understand thrown errors, there is a need for a mechanism by which developers are aided in the debugging process.

SUMMARY

In one aspect of the present invention, a method, a computer program product, and a system includes: (i) obtaining a stack trace corresponding to the code; (ii) analyzing the stack trace to identify stack elements of the stack trace; and (iii) determining target diagnostic information sources based on a comparison between the identified stack elements and diagnostic stack elements corresponding to diagnostic information sources from a database of diagnostic information sources.

According to another aspect of the present invention, a method, a computer program product, and a system includes: (i) determining, for each of the target diagnostic information sources, a similarity value based on the identified stack elements and diagnostic stack elements corresponding to the target diagnostic information source; and (ii) ordering the plurality of target diagnostic information sources based on the determined similarity values.

BRIEF DESCRIPTION OF THE SEVERAL VIEWS OF THE DRAWINGS

For a better understanding of the invention, and to show more clearly how it may be carried into effect, reference will now be made, by way of example only, to the accompanying drawings, in which.

DETAILED DESCRIPTION

Diagnostic searching for code errors using a stack trace where information is extracted from the trace. Comparison of the information with a known corpus of troubleshooting information yields a set of results. Arrangement of the set of results according to relevance and depending upon predetermined weighting is established and presented to a user in an integrated development environment. The present invention may be a system, a method, and/or a computer program product. The computer program product may include a computer readable storage medium (or media) having computer readable program instructions thereon for causing a processor to carry out aspects of the present invention.

The present invention seeks to provide a computer-implemented method for aiding diagnosis of errors in code based on a stack trace.

The present invention also seeks to provide a computer program comprising computer program code means which is adapted, when said computer program is run on a computer, to implement a method for aiding diagnosis of errors in code based on a stack trace.

The present invention additionally seeks to provide a system for aiding diagnosis of errors in code based on a stack trace.

According to an aspect of the present invention, there is provided a computer-implemented method for storing a data structure, the method comprising: segmenting the data structure into a plurality of initial chunks; for each of the plurality of initial chunks, determining a chunk key based on identifying a sequence of bits within the chunk that is unique within the data structure; and re-segmenting the data structure into a plurality of final chunks, divisions corresponding to positions of the identified sequences of bits.

According to an aspect of the invention, there is provided computer-implemented method for aiding diagnosis of errors in code based on a stack trace, the method comprising: obtaining a stack trace corresponding to the code; analyzing the stack trace to identify stack elements of the stack trace; and determining target diagnostic information sources based on a comparison between the identified stack elements and diagnostic stack elements corresponding to diagnostic information sources from a database of diagnostic information sources.

According to a further aspect of the invention, there is provided a computer program comprising computer program code means which is adapted, when said computer program is run on a computer, to implement a method for aiding diagnosis of errors in code based on a stack trace.

According to an aspect of the invention, there is provided a system for aiding diagnosis of errors in code based on a stack trace, the system comprising: an intercept unit configured to obtain a stack trace corresponding to the code; a stack trace analysis unit configured to identify stack elements of the stack trace by analyzing the stack trace; and a diagnostic search unit configured to determine target diagnostic information sources based on a comparison between the identified stack elements and diagnostic stack elements corresponding to diagnostic information sources from a database of diagnostic information sources.

Concepts are proposed for aiding diagnosis of errors in code using a stack trace, by analyzing the stack trace and identifying target diagnostic information sources. In this way, the diagnostic information sources may contain information relevant to debugging the error thrown. More particularly, the stack trace is analyzed to identify stack elements of the stack trace. By a comparison of these identified stack features, with diagnostic stack features associated with diagnostic information sources, the target (relevant) diagnostic information sources are identified. If these target diagnostic information sources are provided to a developer attempting to debug the code, then they may aid the user in more quickly and accurately diagnosing the error.

These and other aspects of the invention will be apparent from and elucidated with reference to the embodiment(s) described hereinafter.

Some embodiments of the present invention are directed to aiding diagnosis of errors in code based on a stack trace.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to".

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Implementations in accordance with the present disclosure relate to various techniques, methods, schemes and/or solutions pertaining to aiding diagnosis of errors in code based on a stack trace. In particular, target diagnostic information sources are identified by comparing stack elements of the stack trace with diagnostic stack elements identified in diagnostic information sources. In this way, relevant target diagnostic information sources may be identified, without the need for a developer to manually search a database of diagnostic information sources.

It has been realized that, by analyzing the stack trace to identify stack elements, diagnostic information sources can be found which are relevant to errors in the code. Accordingly, by presenting these target diagnostic information sources to a user, errors in the code may be diagnosed more efficiently and accurately.

Put another way, the volume of diagnostic information sources typically available to a developer when diagnosing an error in code is extensive. Many of these diagnostic information sources have little or no relevance to an individual stack trace produced in response to an error. Therefore, by automatically searching a database of diagnostic information sources for target (relevant) diagnostic information sources, the process of error diagnosis and correction may be made less time-consuming.

Indeed, in some cases the developer may not even know whether the error has been solved previously. Thus, in situations where the error has not been solved previously, a lot of time may be wasted searching diagnostic information sources for a solution. By providing the developer with target diagnostic information sources which are most relevant to the stack trace, the developer may quickly assess whether the error has been overcome previously.

Embodiments of the invention leverage the vast amount of diagnostic information sources available (e.g. from webpages, blogs, articles, PDFs, e-Books, online forums, library documentation, framework documentation and software documentation) in order to identify target diagnostic information sources which may be useful for the diagnosis of errors based on a stack trace. This is achieved by comparing the obtained stack trace with diagnostic stack elements present within such diagnostic information sources.

Furthermore, if diagnostic stack elements match closely with stack elements of the stack trace, then it is likely that the diagnostic information source will contain information useful for diagnosis of errors in the code. Conversely, if diagnostic stack elements and the stack trace have relatively few features in common, then it is unlikely that the diagnostic information source will contain information useful for diagnosis of errors in the code. This realization is exploited by the present invention in order to improve the speed and accuracy of diagnosing errors in code.

In some embodiments, the method may further comprise additional steps of determining, for each of the target diagnostic information sources, a similarity value based on the identified stack elements and diagnostic stack elements corresponding to the target diagnostic information source, and ordering the plurality of target diagnostic information sources based on the determined similarity values.

In other words, a relevance of the target diagnostic information sources to the stack trace may be assessed based on similarity values. The similarity values are based on a comparison between the identified stack elements and diagnostic stack elements. If identified stack elements and diagnostic stack elements match, are similar, or have features in common then the target diagnostic information source may be considered highly relevant. Conversely, if identified stack elements and diagnostic stack elements are dissimilar then the target diagnostic information source may be considered irrelevant.

Ordering the plurality of target diagnostic information sources may be based on the similarity values. In this way, a developer may be provided with a list of diagnostic information sources, and be provided with knowledge of which are likely to be the most relevant to the error in the code they are attempting to diagnose. This may ultimately improve the speed, efficiency and accuracy of the error diagnosis process.

In further embodiments, the similarity value may be based on matches between identified stack elements and diagnostic stack elements.

Indeed, matches between identified stack elements and diagnostic stack elements imply a high degree of relevance of the target diagnostic information source associated with the diagnostic stack elements. For example, if a stack element and a diagnostic stack element have a matching class, method, filename and line number, then it is increasingly likely that the target diagnostic information source is relevant. Thus, the similarity value may reflect this match, and the ordering of the target diagnostic information sources may reflect this.

In yet further embodiments, the similarity value may be further based on a location of matches between identified stack elements and diagnostic stack elements within the stack.

Matches between stack elements are not the only relevant feature. The locations of such matches may provide an indication as to how relevant the matches are. For example, in some languages the top section of the stack trace will likely contain more relevant frameworks, and therefore matches at the top of the stack will likely indicate more relevance of the target diagnostic information source than matches towards the bottom of the stack trace.

Put another way, matching stack elements which are more recent are often more relevant as to the meaning of the error. In some programming languages, stack elements towards the top of the stack may indicate that the stack elements are more recent. Therefore, by identifying matching stack elements towards the top of the stack, the relevance of the target diagnostic information source may be more accurately identified.

Thus, more relevant target diagnostic information sources may be presented to a developer, improving the speed, efficiency and accuracy of the process of error diagnosis.

In some embodiments, the identified stack elements may comprise at least one of methods, classes, line numbers, package names, filenames, stack depths, error types and error messages.

There are many possible stack elements which indicate the nature of the error. By identifying these stack elements, the relevance of target diagnostic information sources may be improved.

In further embodiments, the stack trace may be obtained responsive to an error during execution of the code.

In this way, target diagnostic information sources may be identified immediately after the occurrence of an error for consultation by a developer attempting to diagnose the error.

In some embodiments, the code may be executed in an integrated development environment (IDE).

In other embodiments, the database of diagnostic information sources includes diagnostic information sources from at least one of webpages, blogs, articles, PDFs, e-Books, online forums, library documentation, framework documentation and software documentation.

By having an extensive and varied diagnostic information source database, the relevance of target diagnostic information may be improved.

In some embodiments, the method involves a further step of communicating the target diagnostic information sources to a user within the IDE.

In this way, the user may be provided with target diagnostic information sources in the environment where the error occurred, thus improving ease of access to target diagnostic information sources.

In additional embodiments, communicating the target diagnostic information sources to a user comprises providing a user selectable indicator to a location of each of the target diagnostic information sources.

In other words, the user may be provided with hyperlinks to the target diagnostic information sources. Accordingly, the ease of access to the target diagnostic information sources may be improved, subsequently improving the speed and efficiency of diagnosing errors in the code.

By way of further explanation, when encountering an error in code many programming languages have built-in support for retrieving a stack trace. The stack trace contains elements which provide clues as to the source of the error, such as a class, method, line number of each of the calling methods. These stack elements may be used to perform searches from a corpus of data (e.g. the internet) to debug the error.

Since there exist multiple pieces of stack elements that make up the stack trace, in some embodiments, a weighting system may be used on the search performed on the corpus of data. By way of example, the top hit that is returned as an answer for the error may be from Stack Overflow and is a direct match to all the classes, methods and line numbers of the stack tracer. Other hits may be returned with just the classes and methods in common, and thus may be prioritized lower, or have just a subset of the lines in common. This prioritized list may be presented to the user so they can work down with the most likely helpful hit at the top to debug their error, saving the debugger time and effort.

Moreover, there exists a corpus of troubleshooting information (database of diagnostic information sources) regarding errors from a large array of sources. Such sources may include webpages, blogs, articles, PDFs, e-Books, online forums, library documentation, framework documentation and software documentation, but may be any source of troubleshooting information. This database of diagnostic information sources may be scanned for stack traces, and the diagnostic stack elements of these stack traces may be indexed using the structures such as general stack trace information and/or per-line stake trace information as shown in tables 1 and 2.

Tables 1 and 2 show the stack elements that may be extracted from each stack trace and diagnostic stack trace. Some of the information may be general, such as exception/error type and exception/error message. Some of the information may be on a per-line basis, such as methods, classes, line numbers, package names, filenames, and stack depths. The identifiable information listed here are the names certain programming languages give for certain concepts. However, it should be understood that the names given here may differ among programming languages. Indeed, it should also be understood that the stack elements may also contain any information in the stack trace.

TABLE 1

General stack trace information.

| Exception/error type | Exception/error message |

TABLE 2

Per-line stack trace information.

| Depth of Stack | Package | Class | Method | Filename | Line Number |

An example stack trace follows. org.springframework.web.util.NestedServletException:Request processing failed; nested exception is java.lang.NullPointerException
   at   org.springframework.web.servlet.FrameworkServlet.processRequest (FrameworkServlet.j ava:1014)
   at   org.springframework.web.servlet.FrameworkServlet.doGet (FrameworkServlet.java:898)
   at   javax.servlet.http.HttpServlet.service (HttpServlet.java:687)

at org. springframework.web.servlet.FrameworkServlet.service (FrameworkServlet.java:883)
at javax.servlet.http.HttpServlet.service (HttpServlet.java:790)
at com.abc.ws.webcontainer.servlet.ServletWrapper.service (ServletWrapper.java:1230)
at [internal classes]
at remote.jcics.test.springmvc.TaskFilter.doFilter (TaskFilter.java:38)
at com.abc.ws.webcontainer.filter.FilterInstanceWrapper.doFilter (FilterInstanceWrapper.java:201)
at [internal classes]

Tables 3 and 4 present the stack elements extracted from the stack trace above.

TABLE 3

Extracted general stack trace information.

| Exception/error type | Exception/error message |
|---|---|
| org.springframework.web.util.NestedServletException | Request processing failed; nested exception is java.lang.NullPointerException |

TABLE 4

Extracted per-line stack trace information.

| Depth of Stack | Package | Class | Method | Filename | Line Number |
|---|---|---|---|---|---|
| 1 | org.springframework.web.servlet | FrameworkServlet | processRequest | FrameworkServlet.java | 1014 |
| 2 | org.springframework.web.servlet | FrameworkServlet | doGet | FrameworkServlet.java | 898 |
| 3 | javax.servlet.http | HttpServlet | service | FrameworkServlet.java | 687 |
| ... | ... | ... | ... | ... | ... |

According to some implementations in accordance with embodiments of the invention, when an error with an accompanying stack trace is encountered by an IDE or other problem diagnosis tool, the stack trace may be introspected to determine stack elements from it. This may be for example, the above-shown stack trace, and the stack elements extracted as shown in Tables 3 and 4. Then, the database of diagnostic information sources may be searched for matching stack traces based on comparisons between the stack elements and diagnostic stack elements.

Further, the target diagnostic information sources may be assigned a similarity value determined by factors which may include the following aspects: (i) Similarity of entire stack trace (e.g. there might be an indication that this library is being used in the same frameworks and therefore same context as the indexed result); (ii) Where the stack trace is not entirely similar, give a greater similarity value based on: (a) similarity between stack elements and diagnostic stack elements which are more recent (i.e. in the top section of the stack trace). For example, this may provide a weighting towards exceptions which are in a more similar direct context as the indexed result, and ignoring to some extent, the less relevant frameworks; and (b) exact line number matches (e.g. this might relate to a bug in this exact version of a library which is relevant to the error).

Given the list of target diagnostic information sources with corresponding similarity values, the IDE may then present the target diagnostic information sources, allowing the user to investigate them and debug the error.

A practical application of the method of aiding diagnosing errors in code based on a stack trace is illustrated in Table 5. In particular, it is shown how a list of target diagnostic information sources may be selectably presented to a user, in the form of a list. The list may be based on the similarity values determined for each target diagnostic information source. By way of example, an error may be encountered in the console. The IDE may then offer a list of results that can be retrieved, and on doing so presents them to the user in a way that allows them to explore each in turn in the form of hyperlinks.

TABLE 5

Extracted per-line stack trace information.
WEIGHTED DIAGNOSTICS

| Priority | Possible Solution Documentation | Solution Link |
|---|---|---|
| 1 | "so, you've got an error, don't panic . . . " | [Solution_A] |
| 2 | "Turning this into that" | [Solution_B] |
| 3 | "Erroneous errors and their symptoms" | [Solution_C] |
| 4 | "Type coercion shouldn't be in other languages" | [Solution_D] |
| 5 | "easy fix 123" | [Solution_E] |

Figure 1:
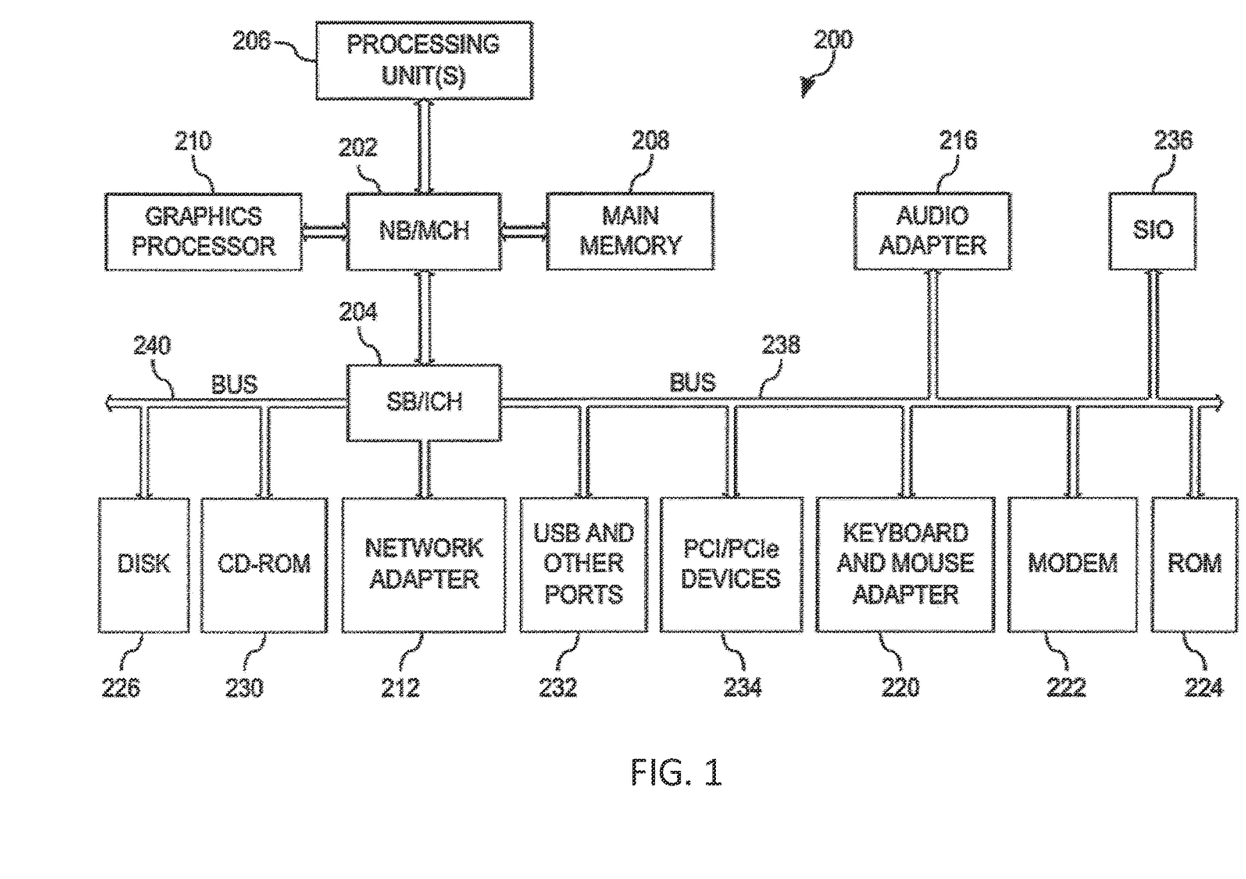
FIG. 1 is a block diagram of an example system in which aspects of the illustrative embodiments may be implemented.

Turning now to FIG. 1, there is presented a block diagram of an example system 200 in which aspects of the illustrative embodiments may be implemented. The system 200 is an example of a computer, such as client in a distributed processing system, in which computer usable code or instructions implementing the processes for illustrative embodiments of the present invention may be located. For instance, the system 200 may be configured to implement an intercept unit, a stack trace analysis unit, a diagnostic search unit and an interface unit according to an embodiment.

In the depicted example, the system 200 employs a hub architecture including a north bridge and memory controller hub (NB/MCH) 202 and a south bridge and input/output (IO) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super IO (SIO) device 236 may be connected to SB/ICH 204.

An operating system runs on the processing unit 206. The operating system coordinates and provides control of various components within the system 200 in FIG. 1. As a client, the operating system may be a commercially available operating system. An object-oriented programming system may run in conjunction with the operating system and provides calls to the operating system from programs or applications executing on system 200.

As a server, system 200 may be, for example, an IBM eServer System p computer system, running the Advanced Interactive Executive (AIX) operating system or the LINUX operating system. The system 200 may be a symmetric multiprocessor (SMP) system including a plurality of processors in processing unit 206. Alternatively, a single processor system may be employed. (Note: the term(s) "IBM," "eSERVER," "System P," "AIX, " and/or "LINUX" may be subject to trademark rights in various jurisdictions throughout the world and are used here only in reference to the products or services properly denominated by the marks to the extent that such trademark rights may exist.)

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 1, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 1, may include one or more devices used to transmit and receive data. A memory may be, for example, main memory 208, ROM 224, or a cache such as found in NB/MCH 202 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 2:
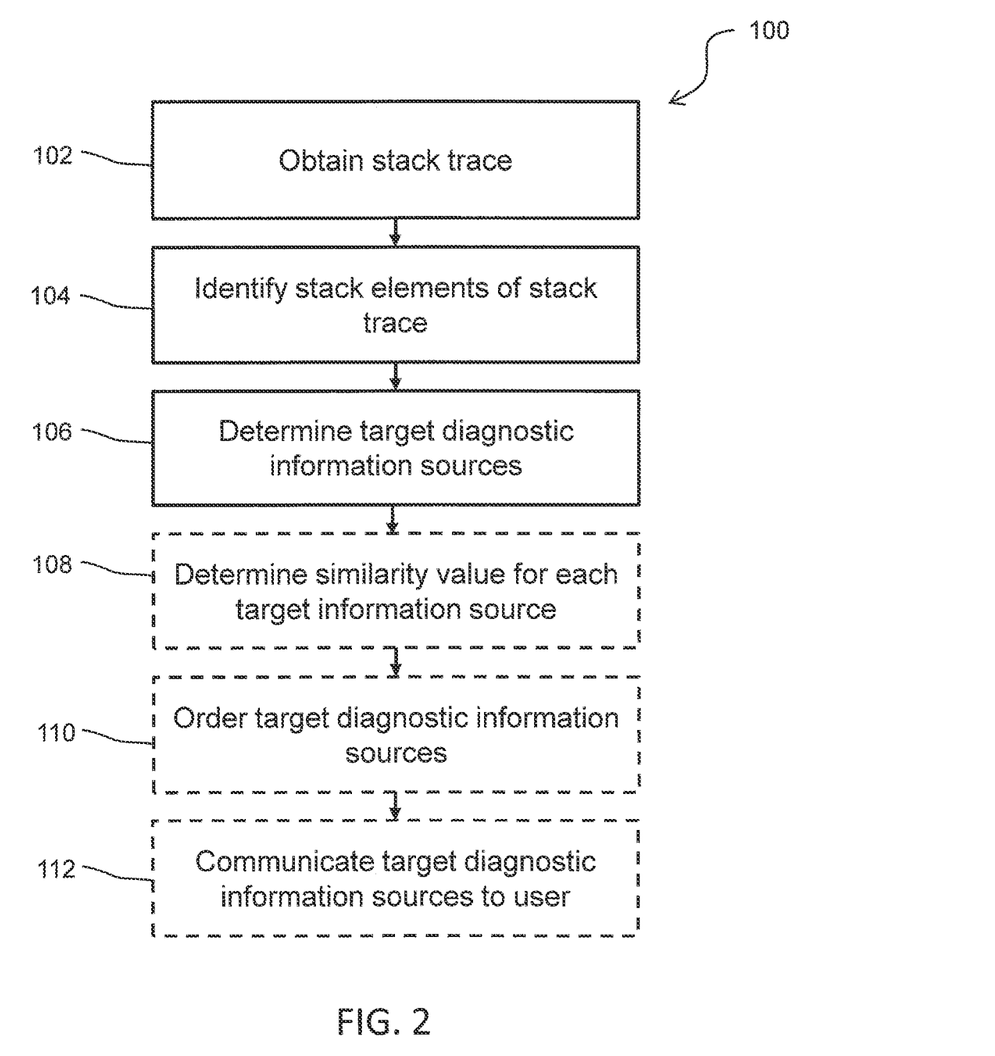
FIG. 2 is a flow diagram of an exemplary embodiment of a method for aiding diagnosis of errors in code based on a stack trace.

Referring now to FIG. 2, there is presented a flow diagram 100 of a method aiding diagnosis of errors in code based on a stack trace. The method may optionally include steps 108 and 110, and/or step 112.

At step 102, a stack trace corresponding to the code is obtained. The stack trace may be obtained responsive to an error during execution of the code. For example, the stack trace may be automatically obtained responsive to an error being thrown by the code during execution, or the stack trace may be obtained by usually retrieved by a user.

The code may be executed in an IDE that presents the stack trace responsive to an error being thrown. In other words, the code may be executed in a runtime in the context of an IDE. Alternatively, the stack trace may be entered into the IDE and presented to the user in a formatted state.

At step 104, the stack trace is analyzed in order to identify stack elements of the stack trace. The stack trace may be analyzed using a natural language processing (NLP) algorithm, or by some other interpreter capable of extracting stack elements.

Identified stack elements may comprise at least one of methods, classes, line numbers, package names, filenames, stack depths, error types and error messages. However, it should be understood that this is not an exhaustive list, and there may be other stack elements.

At step 106, target diagnostic information sources are determined based on a comparison between the identified stack elements and diagnostic stack elements corresponding to diagnostic information sources from a database of diagnostic information sources.

Put another way, identified stack elements and diagnostic stack elements are compared in order to determine diagnostic information sources which may be relevant to the error. For example, if identified stack elements and diagnostic stack elements corresponding to a diagnostic information source share many features in common, then the diagnostic information source is more likely to be relevant for debugging the code than if identified stack elements and diagnostic stack elements share few features in common.

The database of diagnostic information sources may include diagnostic information sources from at least one of webpages, blogs, articles, PDFs, e-Books, online forums, library documentation, framework documentation and software documentation. However, it should be understood that this is not an exhaustive list, and there may be other sources of diagnostic information.

At step 108, a similarity value is determined, for each of the target diagnostic information sources, based on the identified stack elements and diagnostic stack elements corresponding to the target diagnostic information source.

In some cases, the similarity value is based on matches between identified stack elements and diagnostic stack elements. In further cases, the similarity value is further based on a location of the matches between identified stack elements and diagnostic stack elements within the stack. Indeed, the similarity value may be based on near-matches between the identified stack elements and diagnostic stack elements. For example, if the line numbers of the stack elements differ by a small number, then the similarity may be scaled accordingly.

The similarity value may be determined by a similarity value algorithm or may be calculated by a machine learning algorithm.

At step 110, the plurality of target diagnostic information sources are ordered based on the determined similarity values.

By way of example, if a target diagnostic information source has the greatest similarity value, this may indicate that it is highly relevant to the stack trace. Therefore, it may have greatest relevance to the error to be debugged, and so is prioritized. Conversely, if a target diagnostic information source has the smallest similarity value, this may indicate that it is minimally relevant to the stack trace.

At step 112, the target diagnostic information sources are communicated to a user within the IDE. This may be in the form of a pop-up box, presented in a separate window, or integrated within the IDE. In some cases, communicating the target diagnostic information sources to a user may comprise providing a user selectable indicator to a location of each of the target diagnostic information sources. In other words, the user may be provided with hyperlinks to the target diagnostic information (similar to that shown as "solutions links" in Table 5.

Figure 3:
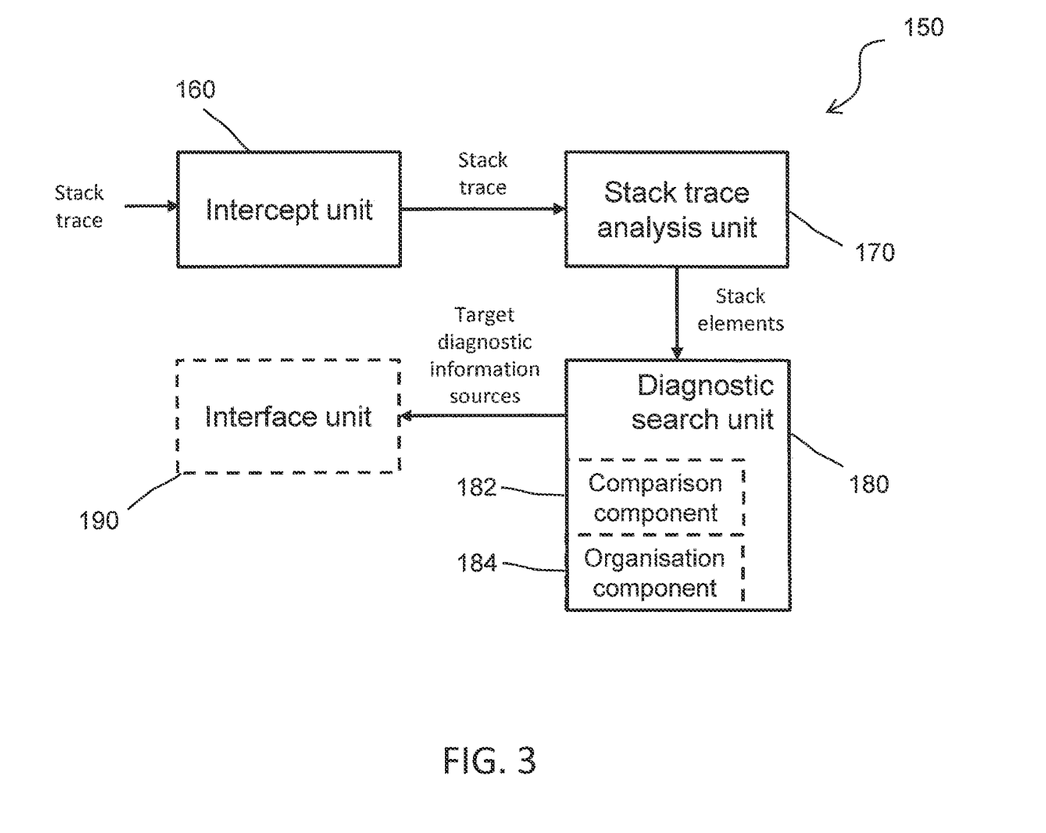
FIG. 3 is a block diagram of an exemplary embodiment of a system for aiding diagnosis of errors in code based on a stack trace.

FIG. 3 depicts a block diagram of an exemplary embodiment of a system 150 for aiding diagnosis of errors in code based on a stack trace. The system includes an intercept unit 160, a stack trace analysis unit 170 and a diagnostic search unit 180. Optionally, the diagnostic search 180 unit may comprise a comparison component 182 and an organization component 184. Further optionally, the system 150 may comprise an interface unit 190.

Firstly, the intercept unit 160 is configured to obtain a stack trace corresponding to the code. In some cases, the intercept unit 160 may obtain the stack trace responsive to an error during execution of the code. The stack trace analysis unit 170 is configured to identify stack elements of the stack trace by analyzing the stack trace.

The diagnostic search unit 180 is configured to determine target diagnostic information sources based on a comparison between the identified stack elements and diagnostic stack elements corresponding to diagnostic information sources from a database of diagnostic information sources.

In some embodiments, the diagnostic search unit 180 further may comprise a comparison component 182 configured to determine, for each of the target diagnostic information sources, a similarity value based on the identified stack elements and diagnostic stack elements corresponding to the target diagnostic information source. In this case, the diagnostic search unit 180 further comprises an organization component 184 configured to order the plurality of target diagnostic information sources based on the determined similarity values.

Finally, the system 150 may further comprise an interface unit 190 configured to communicate the target diagnostic information sources to a user within an IDE.

The system may provide a developer attempting to debug an error in code using a stack trace a fast means of accessing information relevant to the debugging process. In this way, the debugging process is made more time efficient and accurate.

Figure 4:
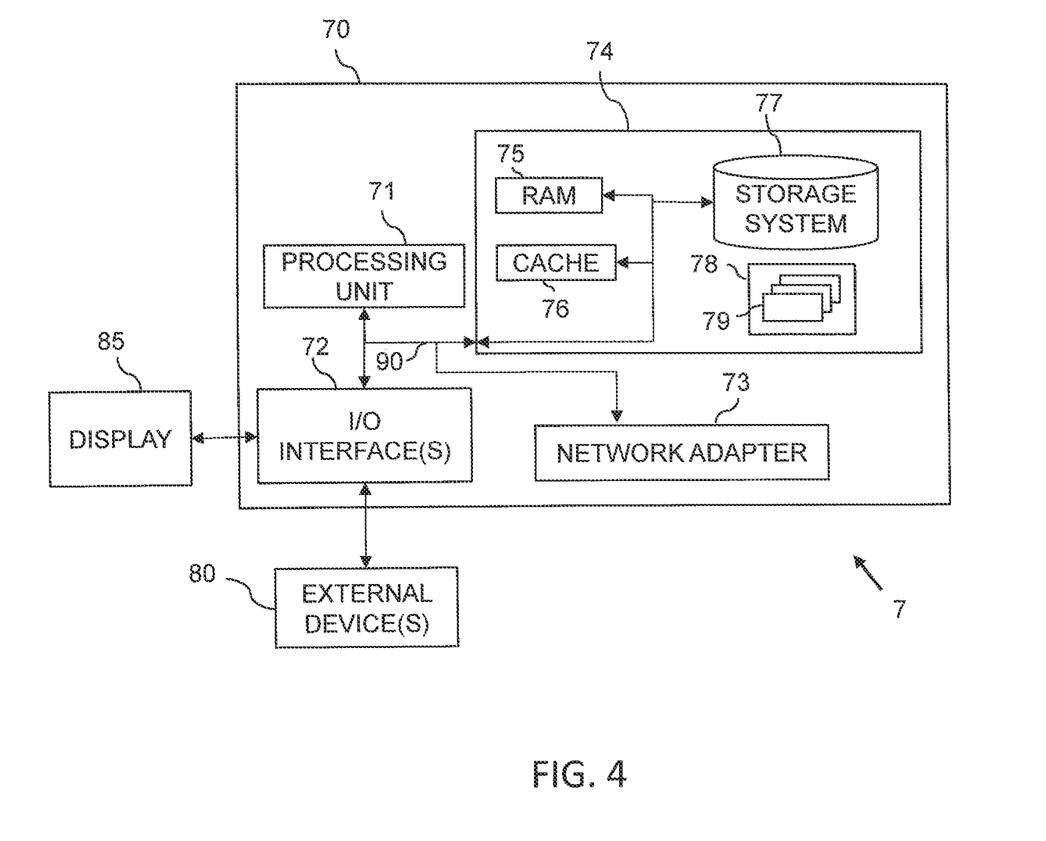
FIG. 4 is a simplified block diagram of a computer system on which the method for populating a data entry field with data may be executed.

By way of further example, as illustrated in FIG. 4, embodiments may comprise a computer system 70, which may form part of a networked system 7. For instance, a system for redacting an image to be displayed by a display device may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for detecting a scene transition in video footage according to a proposed embodiment.

Program/utility 78, having a set (at least one) of program modules 79, may be stored in memory 74. Program modules 79 generally carry out the functions and/or methodologies of proposed embodiments for detecting a scene transition in video footage.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The mere fact that certain measures are recited in mutually different dependent claims does not indicate that a combination of these measures cannot be used to advantage.

Any reference signs in the claims should not be construed as limiting the scope.

Some embodiments of the present invention are directed to aiding diagnosis of errors in code based on a stack trace using a computing system including: (i) an intercept unit configured to obtain a stack trace corresponding to the code; (ii) a stack trace analysis unit configured to identify stack elements of the stack trace by analyzing the stack trace; and (iii) a diagnostic search unit configured to determine target diagnostic information sources based on a comparison between the identified stack elements and diagnostic stack elements corresponding to diagnostic information sources from a database of diagnostic information sources.

Some embodiments of the present invention are directed to a diagnostic search unit including: (i) a comparison component configured to determine, for each of the target diagnostic information sources, a similarity value based on the identified stack elements and diagnostic stack elements corresponding to the target diagnostic information source; and (ii) an organization component configured to order the plurality of target diagnostic information sources based on the determined similarity values.

Some embodiments of the present invention are directed to an intercept using obtaining the stack trace responsive to an error during execution of the code.

Some embodiments of the present invention are directed to an interface unit configured to communicate the target diagnostic information sources to a user within an IDE.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   automatically obtaining a stacktrace responsive to an error being thrown by program code during execution of the program code in an integrated development environment (IDE);
   analyzing, within the IDE, the stacktrace to identify methods and respective stack depths within the stack trace;
   extracting a set of error methods and respective stack depths making up error stack elements of the stack trace;
   creating a table including the error stack elements;
   comparing the error stack elements in the database with diagnostic stack elements of diagnostic stack traces from diagnostic information sources available in online forums, the diagnostic information sources including diagnostic stackelements including diagnostic methods and respective stack depths;
   recording, to the table, hyperlinks to the online forums where diagnostic stack elements including diagnostic methods and respective stack depths are available;
   selecting a plurality of target diagnostic information sources from the diagnostic information sources based on the comparison between the error stack elements including respective stack depths and diagnostic stack elements including respective stack depths; and
   providing, from the table and to a user within the IDE, a user selectable hyperlink to the selected plurality of target diagnostic information sources.

2. The computer-implemented method of claim 1, further comprising:
   determining, for each source of the plurality of target diagnostic information sources, a similarity value based on the comparison of the identified stack elements and corresponding diagnostic stack elements; and
   ordering the plurality of target diagnostic information sources based on the determined similarity values.

3. The computer-implemented method of claim 2, wherein the similarity value is further based on matching stack depths of the identified stack elements and the identified diagnostic stack elements.

4. The computer-implemented method of claim 1, wherein the identified stack elements further comprise at least one of line numbers, error types, and error messages along with their respective stack depths.

5. The computer-implemented method of claim 1, wherein the database of diagnostic information sources further includes diagnostic information sources from at least one of webpages, blogs, articles, PDFs, e-Books, library documentation, framework documentation and software documentation.

6. A computer program product comprising a computer-readable storage medium having a set of instructions stored therein which, when executed by a processor, causes the processor to perform a method comprising:
   automatically obtaining a stack trace responsive to an error being thrown by program code during execution of the program code in an integrated development environment (IDE);
   analyzing, within the IDE, the stack trace to identify methods and respective stack depths within the stack trace;
   extracting a set of error methods and respective stackdepths making up error stack elements of the stack trace;
   creating a table including the error stack elements;
   comparing the error stack elements in the database with diagnostic stack elements of diagnostic stack traces from diagnostic information sources available in online forums, the diagnostic information sources including diagnostic stack elements including diagnostic methods and respective stackdepths;
   recording, to the table, hyperlinks to the online forums where diagnostic stack elements including diagnostic methods and respective stack depths are available;
   selecting a plurality of target diagnostic information sources from the diagnostic information sources based on the comparison between the error stack elements including respective stack depths and diagnostic stack elements including respective stack depths; and providing, from the table and to a user within the IDE, a user selectable hyperlink to the selected plurality of target diagnostic information sources.

7. The computer program product of claim 6, further causing the processor to perform a method comprising:
determining, for each source of the plurality of target diagnostic information sources, a similarity value based on the comparison of the identified stack elements and corresponding diagnostic stack elements; and
ordering the plurality of target diagnostic information sources based on the determined similarity values.

8. The computer program product of claim 7, wherein the similarity value is further based on matching stack depths of the identified stack elements and the identified diagnostic stack elements.

9. The computer program product of claim 6, wherein the identified stack elements further comprise at least one of line numbers, error types, and error messages along with their respective stack depths.

10. The computer program product of claim 6, wherein the database of diagnostic information sources further includes diagnostic information sources from at least one of webpages, blogs, articles, PDFs, e-Books, library documentation, framework documentation and software documentation.

11. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform a method comprising:
automatically obtaining a stack trace responsive to an error being thrown by program code during execution of the program code in an integrated development environment (IDE);
analyzing, within the IDE, the stack trace to identify methods and respective stack depths within the stack trace;
extracting a set of error methods and respective stack depths making up error stack elements of the stack trace;
creating a table including the error stack elements;
comparing the error stack elements in the database with diagnostic stack elements of diagnostic stack traces from diagnostic information sources available in online forums, the diagnostic information sources including diagnostic stack elements including diagnostic methods and respective stack depths;
recording, to the table, hyperlinks to the online forums where diagnostic stack elements including diagnostic methods and respective stack depths are available;
selecting a plurality of target diagnostic information sources from the diagnostic information sources based on the comparison between the error stack elements including respective stack depths and diagnostic stack elements including respective stack depths; and
providing, from the table and to a user within the IDE, a user selectable hyperlink to the selected plurality of target diagnostic information sources.

12. The computer system of claim 11, further causing the processor to perform a method comprising:
determining, for each source of the plurality of target diagnostic information sources, a similarity value based on the comparison of the identified stack elements and corresponding diagnostic stack elements; and
ordering the plurality of target diagnostic information sources based on the determined similarity values.

13. The computer system of claim 12, wherein the similarity value is further based on matching stack depths of the identified stack elements and the identified diagnostic stack elements.

14. The computer system of claim 11, wherein the identified stack elements further comprise at least one of line numbers, error types, and error messages along with their respective stack depths.

15. The computer system of claim 11, wherein the database of diagnostic information sources further includes diagnostic information sources from at least one of webpages, blogs, articles, PDFs, e-Books, library documentation, framework documentation and software documentation.

* * * * *